United States Patent Office 3,380,947
Patented Apr. 30, 1968

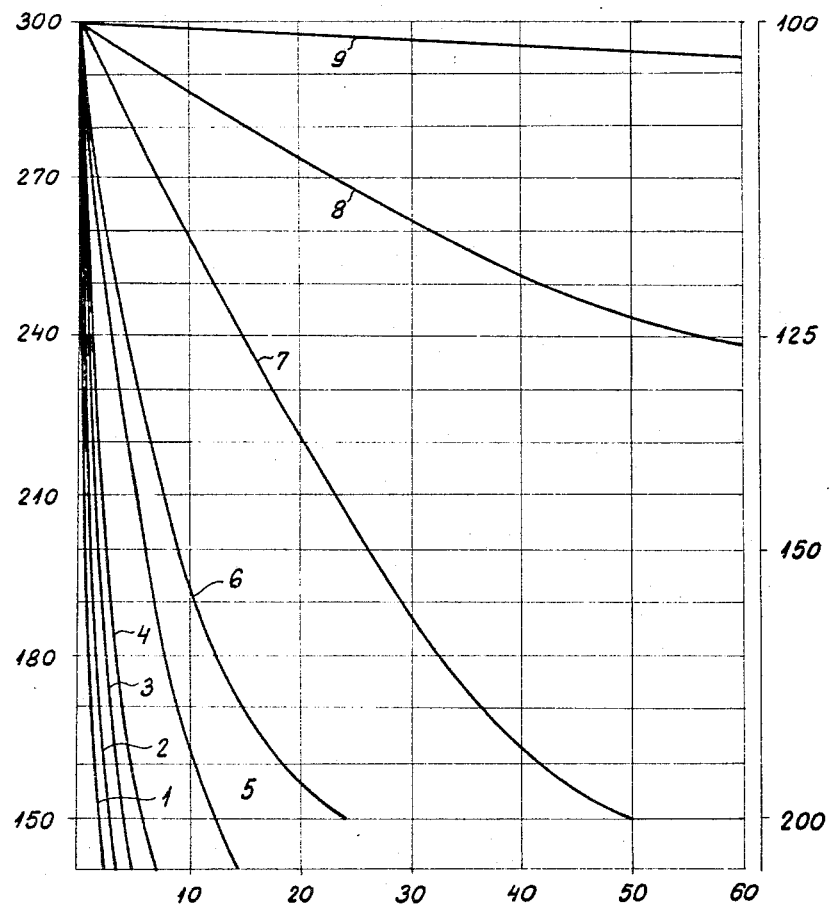

3,380,947
PROCESS FOR THE PREPARATION OF AQUEOUS SOLUTIONS OF FLOCCULATING AGENTS OF THE POLYACRYLIC AMIDE TYPE HAVING HIGH MOLECULAR WEIGHT
Béla Galgoczi, László Demeter, and István Zagyvai, Budapest, and László Soltész, László Sommer, Márton Hercsel, and Lajos Raáb, Fuzfogyartelep, Hungary, assignors to Chemolimpex Magyar Vegyiáru Külkereskedelmi Vállalat, Budapest, Hungary, a firm
Filed Dec. 21, 1965, Ser. No. 515,424
Claims priority, application Hungary, Dec. 21, 1964, BA–1,802
7 Claims. (Cl. 260—29.6)

ABSTRACT OF THE DISCLOSURE

Aqueous solutions of copolymers containing polyacrylic amide and sodium salt of polyacrylic acid of high molecular weight are prepared by hydrolyzing acrylic nitrile monomer with sulfuric acid in the presence of about 0.1–1% by weight of an oil-soluble copper salt inhibitor such as cupric oleate or cupric resinate. An aqueous solution of the hydrolyzed monomer is established, which contains at least about 10% by weight of the hydrolyzed monomer at a pH of about 7.5–9. This precipitates the oil-soluble copper salt inhibitor. The hydrolyzed monomer in this alkaline solution is subjected to the action of an initiator to polymerize the hydrolyzed monomer, at a temperature of about 22–80° C., thereby to produce a substantially water-insoluble gel. The gel is vigorously agitated in a quantity of water sufficient to produce a substantially water-insoluble gel. The gel is vigorously agitated in a quantity of water sufficient to produce a 0.5–3% aqueous colloidal solution of the copolymers.

This invention relates to the preparation of flocculating agents, more particularly it is concerned with aqueous solutions of flocculating agents of the polyacrylic amide type having a high molecular weight. Flocculating agents of the polyacrylic amide type are more and more frequently used in the metal- and coal-processing industries, as water-purifiers and in sewage treatment plants for the thickening of fine dispersions in order to increase the clarification velocity.

Polyacrylic amide may be obtained in two ways. One method comprises the acidic hydrolysis of polyacrylic nitrile, while the other is the polymerization of monomeric acrylic amide. According to the second method monomeric acrylic nitrile is first amidated by means of acidic hydrolysis and the product thus obtained is subjected to polymerization. The latter procedure yields significantly effective, stable products, having higher molecular weight.

Accordingly said process comprises the following three steps:
(a) sulfuric acid hydrolysis of monomeric acrylic nitrile,
(b) neutralization of the hydrolysis product,
(c) polymerization of acrylic amide.

According to up-to-date procedures the hydrolysis of monomeric acrylic nitrile is accomplished with 83–84% sulfuric acid at a temperature of about 90° C. The reaction is carried out for 30–60 minutes, whereupon sulfur powder or copper chips are used as polymerization inhibitor (German Patent 631,592). Hydrolysis carried out in the atmosphere requires great caution, as the temperature may easily suddenly increase and consequently an undesired hydrolysis product having a network structure may be obtained. In order to eliminate the possibility of cross-linking of the products, a continuous process has been worked out, in which the reaction time has been reduced to 8–10 minutes so that the reaction temperature could be increased to 200° C. without running the risk of obtaining products having a network structure (Austrian Patent 219,850).

The neutralization of the acidic acrylic amide solution obtained by hydrolysis, i.e. the separation of acrylic amide from sulfuric acid may be accomplished by several methods. Sodium carbonate, gaseous ammonia or limewash may be used as a neutralizing agent and the salts formed may be removed by means of filtration or freezing. One may also proceed by extracting acrylic amide with a solvent, such as isopropanol or by isolating acrylic amide from the neutralized solution by means of vacuum distillation.

Polymerization of acrylic amide may be carried out in solid or liquid phase. If solid-phase polymerization is used, one may proceed by working in a high vacuum, or even under X-rays. [Schultz et al. Macromol. Chem. 12, 20–34 (1951), Restaino et al., J. of Am. Chem. Soc. 78, 2939 (1956).]

It is preferred and more simple to carry out polymerization in liquid phase. The reaction is accomplished at a pH value of about 8, preferably pH=8 in the presence of initiators of the persulfate type. According to the teachings of the prior art it is of great importance that the acrylic amide concentration of the solution to be polymerized should not exceed 10%, as water-soluble end-products may be obtained only if the monomer concentration of the solution is lower than said value. If, however, the monomer content of the polymerization mixture is higher than 10%, a gelatinous, jelly-like product is obtained. Such products were up to now considered as unsuitable for utilization as flocculating agents (see Austrian Patent 219,850).

According to another method the polymerization of acrylic amide is carried out in the presence of inhibitors (e.g. copper salts). The product obtained in such a manner is water-soluble, the molecular weight thereof is relatively low and this product cannot be used as a flocculating agent (DAS 1,068,013).

The object of the present invention is the preparation of aqueous solutions of flocculating agents of the polyacrylic amide type, which surpass the flocculating effect of the hitherto known products and may be used more economically.

It has been found that aqueous solutions of copolymers containing polyacrylic amide and sodium salts of polyacrylic acid having high molecular weight, possessing highly desirable properties may be obtained by polymerizing the acrylic amide monomer in an aqueous solution containing more than 10%, preferably at least 20% of the monomer, in the presence of a known initiator at a pH value in the range of 7.5–9 preferably about pH 8, at a temperature in the range of 22–80° C., preferably about 35° C., to yield a gelatinous, jelly-like product, practically insoluble in water and converting the product thus obtained to a 0.5% colloidal suspension by means of vigorous mechanical action.

As starting material such as acrylic amide and acrylic acid sodium salt is used, which is prepared by hydrolizing an acrylic nitrile in the presence of 0.1–1.0% of an oil-soluble copper salt inhibitor, preferably cupric oleate or resinate. The last traces of the copper salt inhibitor can be removed by hydrolysis by treating the reaction mixture with metallic iron. A colloid solution of the obtained polymeric product can be prepared by impact shearing carried out at an energy concentration of at least 0.5 cal./liter, minute at 0.01 poise.

The flocculating effect of the product prepared according to the present invention surpasses that of similar products to a significant extent. The increase of efficiency is due to the fact that the degree of polymerization of the polyacrylic amide has been raised, in spite of the eachings of prior art and despite the condtion that by the known methods water-insoluble products would have been obtained. The degree of polymerization of the product exceeds 30,000 and the average molecular weight of same is higher than 2,000,000. The maximal coagulating-flocculating properties of the product prepared according to the present invention meet the requirements summarized below:

(1) The product is a polyelectrolyte and its water-solubility amounts to at least 0.5%.

(2) The molecule possesses a chain-molecule structure, the high degree of polymerization thereof being limited merely by the required minimal water-solubility.

(3) The mole-cohesion increment of the functional groups branching off from the linear chain-polymer molecule should be as high as possible; the dipole-moment of the molecule should amount at least to 5 cal./mole.

Said copper salts may be added in a concentration of 0.1–1.0%, preferably 0.1–0.5% calculated on the monomer. Said inhibitors are readily soluble in the reaction medium of the hydrolysis, but are practically insoluble in the alkaline medium of the second polymerization step, consequently they precipitate and do not influence the polymerization. The sulfuric acid hydrolysis may be carried out at temperature of 85–90° C. In order to avoid the formation of products having a network structure, the temperature should not exceed 100° C. According to a preferred form of the present invention, the traces of the copper salt inhibitor may be removed from the aqueous solution of the acrylic amide monomer in the course of the neutralization of same by contacting with metallic iron.

Polymerization of the monomeric acrylic amide may be carried out in liquid phase, at a pH value in the range of 7.5–9 preferably about pH=8 by using an aqueous solution containing at least 10%, but preferably more than 20% of the monomer. It is preferred to accomplish polymerization in the presence of an initiator, such as ammonium persulfate. The initiator may be added in an amount of 0.1–2.0%.

The above polymerization method provides a gelatinous, jelly-like product. It has been disclosed in the prior art, that such polymers are unsuitable as flocculating agents, due to their insolubility in water. It has been found, however, that such macro-polymers, which have been considered to be water-insoluble according to known methods, may be converted into aqueous, colloidal solutions, having a concentration of e.g. 0.5–3%.

The dissolving of the product may be accomplished by several methods. According to a preferred form one may proceed by exerting vigorous mechanical action, such as impact shearing. As a result of this treatment the macro-molecule is separated from the aggregate and the gelatinous, jelly-like product forms a stable, colloidal non-depositing solution. It is preferred to apply impact shearing with an energy concentration of at least 0.5 cal./liter, minute at 0.01 poise.

The aqueous solutions thus obtained possess more effective and active flocculating properties, than the known agents hitherto used. Thus it is not necessary to carry out polymerization in a solution having a monomer content below 10%, on the other hand, it is advantageous to use a monomeric solution having a concentration of about 25%.

The increased molecular weight of the product obtained according to the present invention is demonstrated by a method, standardized in the lacquer- and dye-industries, said method being based on the determination of the outflow velocity through a Ford funnel. Data obtained by using a Ford 4 funnel are summarized in the following table:

| Product: | Duration of out-flow (sec.) |
|---|---|
| Water (20° C.) | 10.0 |
| Separan NPIO (Dow Chemical) in the form of a 1% solution | 13.2 |
| Product prepared according to the present invention, in the form of a 1% solution | 17.6 |

The improved flocculating effect of the product of the present invention is substantiated by comparative experiments, the results thereof being disclosed on the enclosed figure.

The flocculating effect is compared on an illytekaolin dispersion, having a sludge density of 100 g./l. (a dispersion obtained from Babavolgy, Hungary). The various flocculating agents are used in amounts of 40 g./m.$^3$. On the figure the sludge density (g./l., on the right) and the sludge column height (mm., on the left) are plotted against time (in minute). Graphs 1, 2, 3 and 4 show the effect of the flocculating agent prepared according to the present invention. Graph 5 represents that of Separan NPIO, Graph 6 shows the effect of overpolymerized polyacrylic amide, Graph 7 represents that of known, water-soluble acrylic amides having lower molecular weight, Graph 8 shows the flocculating effect of the water-soluble sodium salt of polyacrylic acid (Solakrol), while Graph 9 illustrates the deposition curve of a non-treated sludge.

It may be seen from this figure, that the flocculating effect of the product prepared according to the process of the present invention is significantly higher than that of the hitherto known and used agents.

Further details of our process are to be found in the example. It is however by no means intended to limit the scope of the invention to the specific example.

Example 0.5% of cupric oleate or resinate is disclosed in 53 g. (1 mole) of acrylic nitrile monomer. 1 mole of 84.5% sulfuric acid is heated to 85–95° C. The acrylic nitrile monomer and the initiator are added to the sulfuric acid during 1 hour, whereupon the reaction mixture is heated at 90–95° C. for 1–1.5 hours. The mixture is then cooled to 40° C. and its pH is adjusted with an aqueous sodium carbonate solution (1 part of $Na_2CO_3$ dissolved in 3 parts of water) to the value of 8. The sodium carbonate solution is added at such a rate that the temperature does not exceed 60–70° C. On neutralization sodium sulfate precipitates, which is filtered off or decanted, whereupon the filtrate is cooled overnight in order to precipitate fully the sodium sulphate still dissolved. The monomer mixture thus obtained consists predominantly of acrylic amide and of the sodium salt of acrylic acid and is free of sodium sulphate. The aqueous solution of 1% of ammonium persulfate is added at 35° C. while stirring. The reaction mixture is kept at 35° C. for another 2 hours, whereupon it is filtered and allowed to stand. After several hours of standing the product is a transparent, slightly yellow, gelatinous, jelly-like material. The active ingredient content of the product amounts to 20–25% and it may be stored and transported in its original form. On utilization the gelatinous product may be converted into a 1–2% aqueous solution by means of impact shearing carried out with high energy concentration. The solution thus obtained may be directly used or it may be diluted before utilization. The breaking may be preferably accomplished by using a gel breaking apparatus rebuilt from a centrifugal pump. From 54 kg. of acrylic nitrile 70–75 kg. of a 25% end-product may be obtained, the molecular weight thereof being above 3,000,000.

The product prepared according to the present invention may be used for the thickening of fine dispersions of metal-, coal- or industrial mineral-pulps for the increase of clarification velocity and the augmentation of clarifying-filtering capacity. In hydro-metallurgical processes the clarification velocity of dispersions of metaloxides, metal-hydroxides or metal-carbonates may be increased as well. The product may also be used for the coagulation of materials suspended in surface waters, i.e. by the purification of industrial or outlet waters carried out by clarification.

What we claim is:

1. A process for the preparation of aqueous solutions of copolymers containing polyacrylic amide and sodium salt of polyacrylic acid of high molecular weight, comprising hydrolyzing acrylic nitrile monomer with sulfuric acid in the presence of about 0.1%–1% by weight of the monomer of an oil-soluble copper salt inhibitor, establishing an aqueous solution of the hydrolyzed monomer containing at least about 10% by weight of the hydrolyzed monomer at a pH of about 7.5–9 to precipitate the oil-soluble copper salt inhibitor, subjecting the hydrolyzed monomer in the latter solution to the action of an initiator to polymerize the hydrolyzed monomer at a temperature of about 22–80° C. to produce a substantially water-insoluble gel, and subjecting said gel to vigorous mechanical action in a quantity of water sufficient to produce a 0.5–3% aqueous colloidal solution of said copolymers.

2. A process as claimed in claim 1, said aqueous solution of the hydrolyzed monomer containing at least about 20% by weight of the hydrolyzed monomer.

3. A process as claimed in claim 1, said aqueous solution of the hydrolyzed monomer having a pH of about 8.

4. A process as claimed in claim 1, said polymerization being conducted at about 35° C.

5. A process as claimed in claim 1, said inhibitor being cupric oleate.

6. A process as claimed in claim 1, said inhibitor being cupric resinate.

7. A process as claimed in claim 1, said vigorous mechanical action consisting of impact shearing carried out at an energy concentration of at least about 0.5 cal./liter/minute at 0.01 poise.

References Cited
UNITED STATES PATENTS 2,734,915   2/1958   Jones _____ 260—89.7

FOREIGN PATENTS 1,155,598   10/1963   Germany.

MURRAY TILLMAN, *Primary Examiner.*

G. F. LESMES, W. J. BRIGGS, *Assistant Examiners.*